United States Patent
Shirai et al.

(10) Patent No.: US 6,501,540 B2
(45) Date of Patent: Dec. 31, 2002

(54) SURVEYING INSTRUMENT HAVING AN OPTICAL DISTANCE METER

(75) Inventors: Masami Shirai, Saitama (JP); Shunichiro Wakamiya, Saitama (JP)

(73) Assignee: Pentax Corporation, Tokyo (JP)

( * ) Notice: Subject to any disclaimer, the term of this patent is extended or adjusted under 35 U.S.C. 154(b) by 0 days.

(21) Appl. No.: 09/847,408

(22) Filed: May 3, 2001

(65) Prior Publication Data

US 2002/0008865 A1 Jan. 24, 2002

(30) Foreign Application Priority Data

May 11, 2000 (JP) ...................................... 2000-138312

(51) Int. Cl.[7] .............................................. G01C 3/08
(52) U.S. Cl. ...................................... 356/5.1; 356/4.01
(58) Field of Search ............................... 356/4.01–5.15, 356/5.1; 396/106, 111, 148, 268, 271, 272

(56) References Cited

U.S. PATENT DOCUMENTS

| | | | | |
|---|---|---|---|---|
| 4,005,458 A | * | 1/1977 | Okuno | ........................ 354/155 |
| 4,916,324 A | * | 4/1990 | Meier | ......................... 250/561 |
| 5,329,347 A | * | 7/1994 | Wallace et al. | ................. 356/5 |
| 5,517,297 A | * | 5/1996 | Stenton | ..................... 356/4.01 |
| 5,886,340 A | | 3/1999 | Suzuki et al. | |
| 5,886,777 A | | 3/1999 | Hirunuma | |
| 5,923,468 A | | 7/1999 | Tsuda et al. | |
| 5,949,548 A | | 9/1999 | Shirai et al. | |
| 6,072,642 A | | 6/2000 | Shirai | |
| 6,194,694 B1 | | 2/2001 | Shirai | |
| 6,324,024 B1 | * | 11/2001 | Shirai et al. | ................. 359/884 |

* cited by examiner

Primary Examiner—Thomas H. Tarcza
Assistant Examiner—Brian Andrea
(74) Attorney, Agent, or Firm—Greenblum & Bernstein, P.L.C.

(57) ABSTRACT

A surveying instrument includes a sighting telescope for sighting an object; an optical distance meter which includes a light-transmitting optical system for transmitting a measuring light toward the object via the sighting telescope, a light-receiving optical system for receiving light reflected by the object, and a light-receiving element which receives the measuring light reflected by the object and received by the light-receiving optical system; and a light shield mask positioned on an optical axis between the eyepiece and the light-receiving element to cut off incoming rays from the eyepiece.

11 Claims, 6 Drawing Sheets

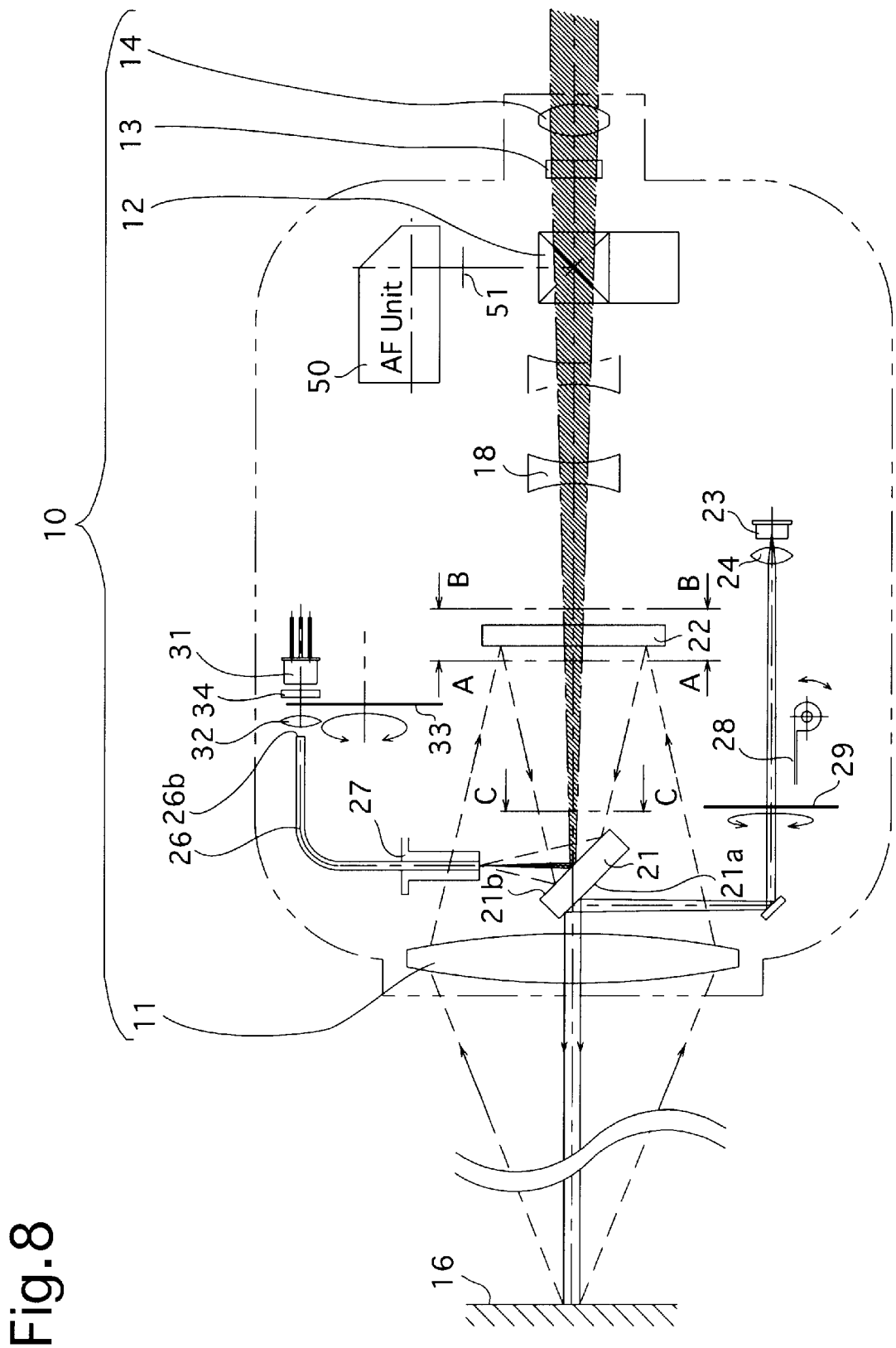

SURVEYING INSTRUMENT HAVING AN OPTICAL DISTANCE METER

BACKGROUND OF THE INVENTION

1. Field of the Invention

The present invention relates to a surveying instrument having an optical distance meter.

2. Description of the Related Art

A conventional surveying instrument such as a total station has a function to measure the distance between two points and also horizontal and vertical angles. Such a conventional surveying instrument generally measures the distance between two points with a distance meter, usually an electronic distance meter (EDM) incorporated in or attached to the surveying instrument.

The electronic distance meter incorporates an optical distance meter which calculates the distance from the phase-difference or the time difference between a measuring light (externally-projecting light), which is projected toward a target, and an internal reference light. The optical distance meter includes a light-transmitting optical system for transmitting a measuring light to the target via the objective lens of a sighting telescope provided as a component of the electronic distance meter, and a light-receiving optical system for receiving light reflected by the target. The light-receiving optical system includes a wavelength selection filter for reflecting the measuring light which is reflected by the target to be passed through the objective lens of the sighting telescope, toward a light receiving element. The measuring light and the internal reference light are alternately incident on the light receiving element during operation of the optical distance meter.

To improve the precision of the optical distance meter by increasing the signal-to-noise ratio (S/N) of a signal of a received light, the light receiving element preferably receives only the measuring light and the internal reference light. However, in conventional surveying instruments which incorporates an electronic distance meter, it is sometimes the case that ambient light enters into the sighting telescope via the eyepiece thereof. This is a leading cause of deteriorating the precision of the optical distance meter.

SUMMARY OF THE INVENTION

The present invention has been devised in view of the problem noted above, and accordingly, an object of the present invention is to provide a surveying instrument having an optical distance meter, wherein ambient light which enters into the sighting telescope via the eyepiece thereof has no adverse effect on the precision of the optical distance meter.

To achieve the objects mentioned above, according to an aspect of the present invention, a surveying instrument is provided, including a sighting telescope for sighting an object; an optical distance meter which includes a light-transmitting optical system for transmitting a measuring light toward the object via the sighting telescope, a light-receiving optical system for receiving light reflected by the object, and a light-receiving element which receives the measuring light reflected by the object and received by the light-receiving optical system; and a light shield mask positioned on an optical axis between the eyepiece and the light-receiving element to cut off incoming rays from the eyepiece.

Preferably, the light-transmitting optical system includes a wavelength selection filter which reflects the measuring light reflected by the object and passed through an objective lens of the sighting telescope, in a forward direction along an optical path of the sighting telescope; and a mirror which reflects the measuring light reflected by the wavelength selection filter outside the optical path of the sighting telescope.

The light shield mask can be fixed to the wavelength selection filter. Alternatively, the light shield mask can be fixed to the mirror.

In an embodiment, the surveying instrument further includes a focus detecting device for detecting a focus state of the sighting telescope; and a controller for controlling the sighting telescope to automatically focus on the object in accordance with the focus state detected by the focus detecting device.

Preferably, the focus detecting device is a phase-difference detection focus detecting device which detects an in-focus state from a correlation between a pair of images respectively formed by two light bundles which are respectively passed through two different pupil areas of the phase-difference detection focus detecting device and passed through different portions of an objective lens of the sighting telescope. The light shield mask is positioned so as not to interfere with the two different pupil areas.

In an embodiment, the sighting telescope includes a focus adjustment lens having a negative power, which is moved in accordance with the focus state detected by the focus detecting device.

In an embodiment, the light shield mask is fixed to the focus adjustment lens.

In an embodiment, the wavelength selection filter reflects only a portion of light having specific wavelengths which is reflected by the object and passed through the objective lens.

Preferably, the mirror is made of a parallel-plate mirror having front and rear surfaces parallel to each other. The rear surface which faces the wavelength selection filter reflects the measuring light reflected by the wavelength selection filter toward the outside of the optical path of the sighting telescope.

In an embodiment, the objective lens of the sighting telescope is moved to bring the object in focus in accordance with the focus state detected by the focus detecting device.

According to another aspect of the present invention, a surveying instrument is provided, including a sighting telescope for sighting an object; a light emitting element which emits a measuring light toward the object via the sighting telescope; an optical distance meter having a light-receiving element which receives the measuring light reflected by the object and passed through an objective lens of the sighting telescope; and a light shield mask positioned on an optical axis between the eyepiece and the light-receiving element to cut off incoming rays from the eyepiece.

The present disclosure relates to subject matter contained in Japanese Patent Application No.2000-138312 (filed on May 11, 2000) which is expressly incorporated herein by reference in its entirety.

BRIEF DESCRIPTION OF THE DRAWINGS

The present invention will be described below in detail with reference to the accompanying drawings in which:

FIG. 8 is a view similar to that of FIG. 5 and illustrates a light path of ambient light which enters into the sighting telescope via the eyepiece thereof.

DESCRIPTION OF THE PREFERRED EMBODIMENTS

Figure 1:
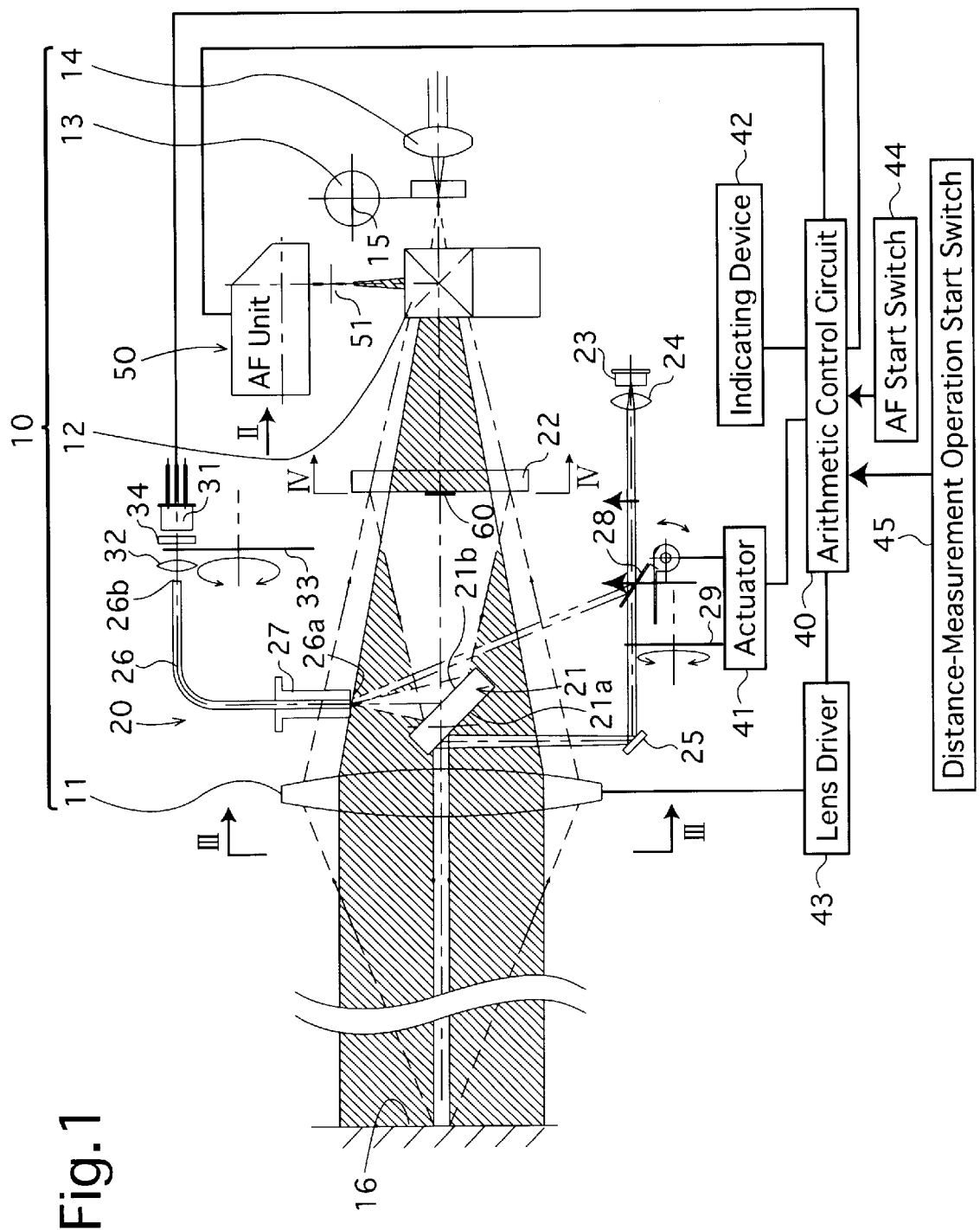
FIG. 1 is a schematic diagram of the first embodiment of an electronic distance meter according to the present invention.

FIG. 1 shows the first embodiment of an electronic distance meter (EDM) according to the present invention. This electronic distance meter incorporates an autofocus distance-measuring system, and can be incorporated in or attached to a surveying instrument such as a total station. Firstly, the overall structure of the electronic distance meter will be hereinafter discussed.

The electronic distance meter is provided with a sighting telescope 10 and an optical distance meter 20. As shown in FIG. 1, the sighting telescope 10 is provided with an objective lens 11, a Porro prism (erecting optical system) 12, a focal-plane plate (reticle plate) 13, and an eyepiece lens 14, in that order from the object side (i.e., left to right as shown in FIG. 1). The focal-plane plate 13 is provided thereon with a reticle (cross hair) 15. The objective lens 11 is guided in the direction of the optical axis thereof. The image of an object (sighting object) 16 that is formed through the objective lens 11 can be precisely focused on the front surface (the surface facing the objective lens 11) of the focal-plane plate 13 by adjusting the axial position of the objective lens 11 in accordance with the distance of the sighting object 16 with respect to the sighting telescope 10. The user (surveyor) of the surveying instrument sights a magnified image of the sighting object 16, which is focused on the focal-plane plate 13, via the eyepiece 14.

The electronic distance meter is provided, behind the objective lens 11 of the sighting telescope 10, with a light transmitting/receiving mirror 21 and a wavelength selection filter 22, which are arranged in that order from the object side. The light transmitting/receiving mirror 21 and the wavelength selection filter 22 are optical elements of a light-receiving optical system of the optical distance meter 20. The light transmitting/receiving mirror 21 is made of a parallel-plate mirror having front and rear parallel surfaces positioned on the optical axis of the objective lens 11. The front surface of the parallel-plate mirror which faces the objective lens 11 is formed as a light transmitting mirror 21a, while the rear surface of the parallel-plate mirror which faces the wavelength selection filter 22 is formed as a light receiving mirror 21b.

The optical distance meter 20 is provided with a light-emitting element (laser diode) 23 which emits light (measuring light) having a specific wavelength. The measuring light emitted from the light-emitting element 23 is incident on the light transmitting mirror 21a via a collimating lens 24 and a fixed mirror 25. The measuring light is then reflected by the light transmitting mirror 21a to proceed toward the sighting object 16 along the optical axis of the objective lens 11. The collimating lens 24, the fixed mirror 25 and the light transmitting mirror 21a (light transmitting/receiving mirror 21) are optical elements of a light-transmitting optical system of the optical distance meter 20.

The measuring light which is reflected by the sighting object 16 to be passed through the objective lens 11 is reflected back to the light receiving mirror 21b via the wavelength selection filter 22. Thereafter, the light receiving mirror 21b reflects the incident measuring light so as to make the measuring light enter at an incident end surface 26a of a light receiving optical fiber 26. A fiber holder 27 supports the incident end of the light receiving optical fiber 26 which has the incident end surface 26a. The fiber holder 27 is immovably supported together with the light transmitting/receiving mirror 21 by a fixing device (not shown) provided in a space behind the objective lens 11.

The electronic distance meter is provided between the light-emitting element 23 and the fixed mirror 25, on a distance-measuring optical path, with a switching mirror 28 and a first ND filter 29. The light (measuring light) emitted by the light-emitting element 23 is incident on the fixed mirror 25 when the switching mirror 28 is retracted from the optical path between the collimating lens 24 and the fixed mirror 25, and the light (internal reference light) emitted by the light-emitting element 23 is reflected by the switching mirror 28 to be incident directly on the incident end surface 26a of the light receiving optical fiber 26 when the switching mirror 28 is positioned in the optical path between the collimating lens 24 and the fixed mirror 25. The first ND filter 29 is used to adjust the amount of light of the measuring light incident on the sighting object 16.

The electronic distance meter is provided between an exit end surface 26b of the light receiving optical fiber 26 and a light-receiving element 31 with a condenser lens 32, a second ND filter 33 and a band-pass filter 34, in that order from the exit end surface 26b to the light-receiving element 31. The light-receiving element 31 is connected to an arithmetic control circuit (controller) 40. The arithmetic control circuit 40 is connected to an actuator 41 which drives the switching mirror 28, and an indicating device (e.g., an LCD panel) 42 which indicates the calculated distance.

As known in the art, the optical distance meter 20 establishes two different states: one state wherein the measuring light emitted by the light-emitting element 23 is supplied to the fixed mirror 25, and another state wherein the same light (internal reference light) is directly supplied to the incident end surface 26a of the light receiving optical fiber 26, which are determined in accordance with the switching state of the switching mirror 28 driven by the arithmetic control circuit 40 via the actuator 41. As described above, the measuring light supplied to the fixed mirror 25 is projected toward the sighting object 16 via the light-transmitting mirror 21a and the objective lens 11, and the measuring light reflected by the sighting object 16 is incident on the incident end surface 26a via the objective lens 11, the wavelength selection filter 22, and the light receiving mirror 21b. Thereafter, both the measuring light reflected by the sighting object 16 to be eventually incident on the incident end surface 26a, and the internal reference light directly supplied to the incident end surface 26a via the switching mirror 28 are received by the light-receiving element 31. The arithmetic control circuit 40 detects the phase difference between the projecting light and the reflected light and the initial phase of the internal reference light, or the time difference between the projecting light and the reflected light, to calculate the distance from the electronic distance meter to the sighting object. The calculated distance is indicated by the indicating device 42. Such an operation of calculating the distance from the phase difference between the projecting light and the reflected light and from the initial phase of the internal reference light, or from the time difference between the projecting light and the reflected light is well known in the art.

Figure 2:
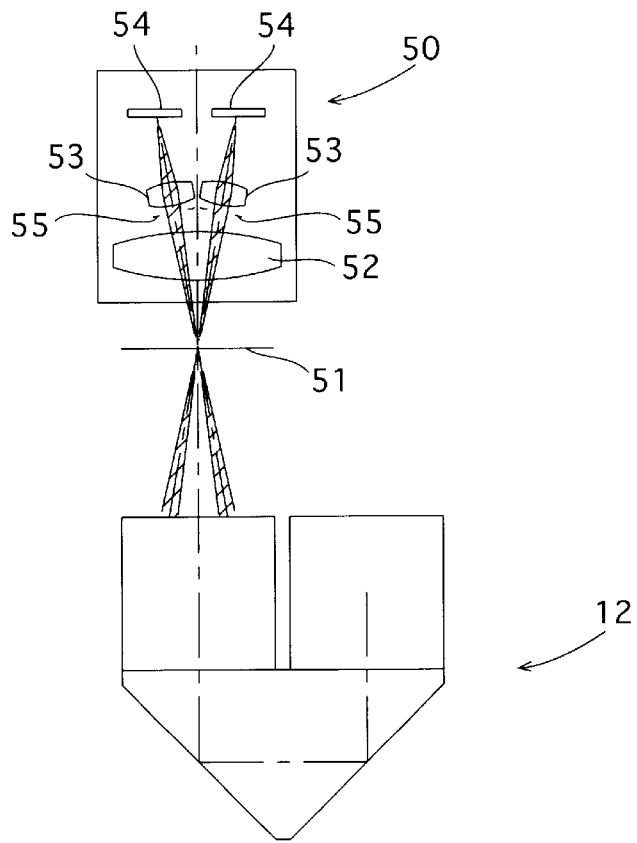
FIG. 2 is a conceptual diagram of a focus detecting device (an AF sensor unit/phase-difference detection focus detecting device) and a Porro prism, as viewed in the direction of an arrow II shown in FIG. 1.

The Porro prism 12 is provided with a beam splitting surface which splits the incident light bundle into two light bundles, so that one of the two light bundles proceeds toward a phase-difference detection AF sensor unit (focus detecting device) 50 while the other light bundle proceeds toward the eyepiece 14. Between the Porro prism 12 and the phase-difference detection AF sensor unit 50 is formed a reference focal plane 51 which is located at a position optically equivalent to the position at which the reticle 15 of the focal-plane plate 13 is placed. The phase-difference detection AF sensor unit 50 detects the focus state (i.e., the amount of defocus and direction of focal shift) on the reference focal plane 51. FIG. 2 shows a conceptual diagram of the phase-difference detection AF sensor unit 50 and the Porro prism 12. The phase-difference detection AF sensor unit 50 includes a condenser lens 52, a pair of separator lenses 53, and a pair of line sensors (e.g., multi segment CCD sensors) 54 located behind the respective separator lenses 53. The pair of separator lenses 53 are arranged apart from each other by the base length. The image of the sighting object 16 formed on the reference focal plane 51 is separated into two images by the pair of separator lenses 53 to be respectively formed on the pair of line sensors 54. Each of the pair of line sensors 54 includes an array of photoelectric converting elements. Each photoelectric converting element converts the received light of an image into electric charges which are integrated (accumulated), and outputs as an integrated electric charge to the arithmetic control circuit 40 to constitute AF sensor data. The arithmetic control circuit 40 calculates an amount of defocus through a predetermined defocus operation in accordance with a pair of AF sensor data respectively input from the pair of line sensors 54. In an autofocus operation, the arithmetic control circuit 40 drives the objective lens 11 to bring the sighting object into focus via a lens driver 43 (see FIG. 1) in accordance with the calculated amount of defocus. The defocus operation is well-known in the art. An AF start switch 44 and a distance-measurement operation start switch 45 are connected to the arithmetic control circuit 40.

The phase-difference detection AF sensor unit 50 detects an in-focus state from the pair of images respectively formed on the pair of line sensors 54 by two light bundles which are respectively passed through two different pupil areas 11A and 11B defined on the objective lens 11. The shape of each of the two pupil areas 11A and 11B are determined by the shape of the aperture formed on a corresponding one of a pair of separator masks 55 which are respectively positioned in the vicinity of the pair of separator lenses 53 between the condenser lens 52 and the pair of separator lenses 53.

Figure 3:
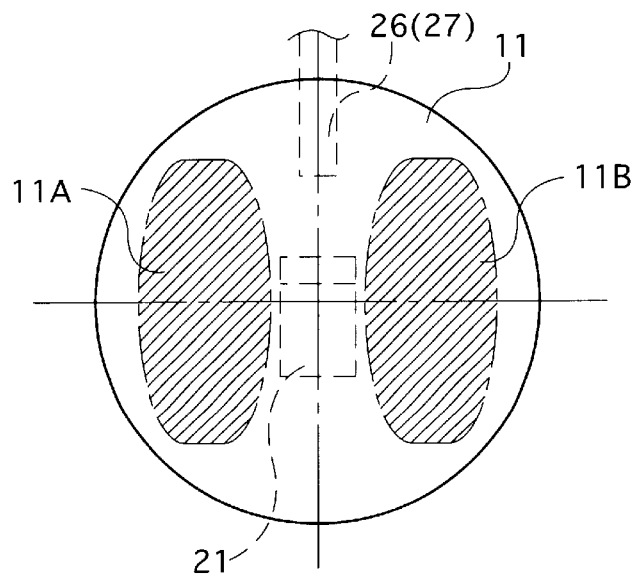
FIG. 3 is an explanatory view of an objective lens of a sighting telescope, as viewed in the direction of arrows III shown in FIG. 1, showing the positional relationship among a pair of pupil areas defined on the objective lens, a light transmitting/receiving mirror, and a light receiving fiber.

FIG. 3 shows the positional relationship between the two pupil areas 11A and 11B and the positional relationship between the light transmitting/receiving mirror 21 and the light receiving optical fiber 26 (the fiber holder 27) of the optical distance meter 20. Although the positions, shapes and directions of the two pupil areas 11A and 11B are determined by the condenser lens 52, the pair of separator lenses 53, the pair of separator masks 55, and the array of photoelectric converting elements of each line sensor 54 so as to satisfy the performance of autofocus, the directions of the two pupil areas 11A and 11B (the directions of the two pupil areas 11A and 11B relative to the center of the objective lens 11) are determined so that the sighting object 16 is easy to be brought into focus.

Figure 4:
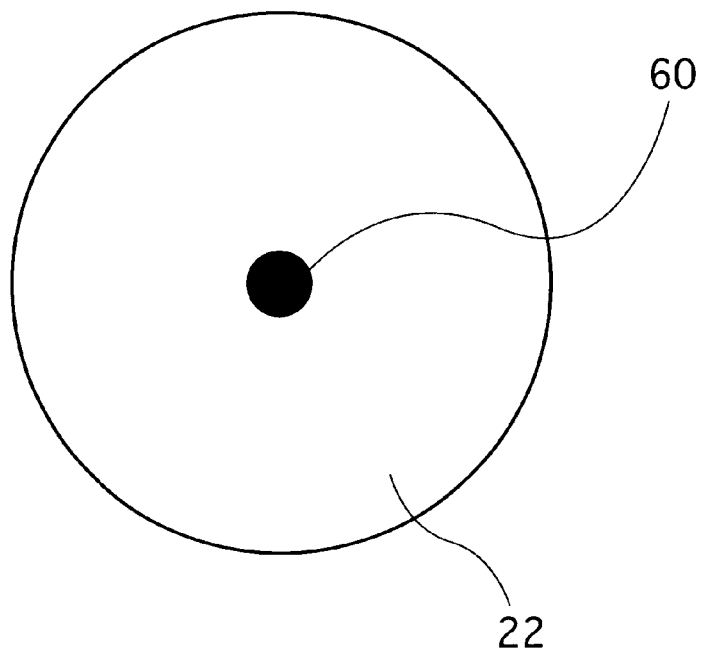
FIG. 4 is a front elevational view of a wavelength selection filter shown in FIG. 1, as viewed in the direction of arrows IV shown in FIG. 1.

A feature of the electronic distance meter of the present invention, having the above described structure, is that a light shield mask 60 (see FIGS. 1 and 4) is fixed to the wavelength selection filter 22 at the center thereof to prevent ambient light (e.g., direct or reflected sunlight) from entering into the sighting telescope 10 via the eyepiece 14 and to prevent the ambient light from being eventually incident on the light-receiving element 31. FIG. 8 illustrates a light path of such ambient light. The light shield mask 60 is fixed to the wavelength selection filter 22 to be positioned on the optical axis between the eyepiece 14 and the light-receiving element 31 so as to cut off the incoming light (incoming rays) from the eyepiece 14. This makes it impossible for the incoming light from the eyepiece 14 to enter the light-receiving element 31. The light shield mask 60 only needs to have a sufficient size for cutting off the incoming light from the eyepiece 14 while not interfering with the two pupil areas 11A and 11B. The light shield mask 60 is preferably made of an opaque material which does not allow any light to pass therethrough. Such an opaque material can be coated or painted on the wavelength selection filter 22 to fix the light shield mask 60 to the center of the wavelength selection filter 22 as shown in FIGS. 1 and 4. However, the incoming light from the eyepiece 14 can be cut off to some extent by the light shield mask 60 even if the light shield mask 60 is made of a translucent material which reduces the amount of light of the incoming light. Alternatively, the light shield mask 60 can be provided as a filter which does not transmit light having a specific wavelength range which can be sensed by the light-receiving element 31.

The electronic distance meter having the above described structure performs a distance measuring operation in a manner such as described in the following description.

In the first step, a surveyor (user) aims the sighting telescope 10 at the sighting object 16 so that the optical axis of the sighting telescope 10 is generally in line with the sighting object 16, while viewing the sighting object 16 through a collimator (not shown) which is attached to the sighting telescope 10. In the second step, the surveyor depresses the AF start switch 44 to perform the aforementioned autofocus operation to move the objective lens 11 to an in-focus position (in-focus state) thereof relative to the sighting object 16. In the third step, in a state where the sighting telescope 10 is in focus relative to the sighting object 16, the surveyor adjusts the direction of the sighting telescope 10 so that the reticle (cross hair) 15 viewed through the eyepiece 14 is precisely centered on the sighting object 16 while looking into the eyepiece 14. In the fourth step, the surveyor depresses the distance-measurement operation start switch 45 to perform the above-described distance-calculating operation, wherein the calculated distance is indicated on the indicating device 42.

In this distance measuring operation, even if the ambient light enters into the sighting telescope 10 via the eyepiece 14, the ambient light is cut off by the light shielding mask 60 and is therefore not incident on the light-receiving element 31. Accordingly, such ambient light has no adverse effect on the precision of the optical distance meter 20. Moreover, since the measuring light which is reflected by the sighting object 16 to be passed through the objective lens 11 is partly interrupted by the light transmitting/receiving mirror 21 so that the remaining part of the measuring light is reflected by the wavelength selection filter 22 except for a central part thereof to which the light shield mask 60 is fixed, the measuring light which is incident on the wavelength selection filter 22 does not interfere with the light shield mask 60. Furthermore, since the light shield mask 60 is positioned so as not to interfere with the two different pupil areas 11A and 11B, the light shield mask 60 does not interfere with the autofocus function of the phase-difference detection AF sensor unit 50. Furthermore, since the light shield mask 60 is formed on a small area on the optical axis of the sighting telescope, the light shield mask 60 does not have any adverse effect on the visual performance of the sighting telescope via the eyepiece 14.

It can be understood from the foregoing that the ambient light which enters into the sighting telescope 10 via the eyepiece 14 can be prevented from being incident on the light-receiving element 31 without having any adverse effect on the autofocus function of the phase-difference detection AF sensor unit 50 or the visual performance of the sighting telescope by providing the wavelength selection filter 22 with the light shield mask 60 at the center of the wavelength selection filter 22.

Figure 5:
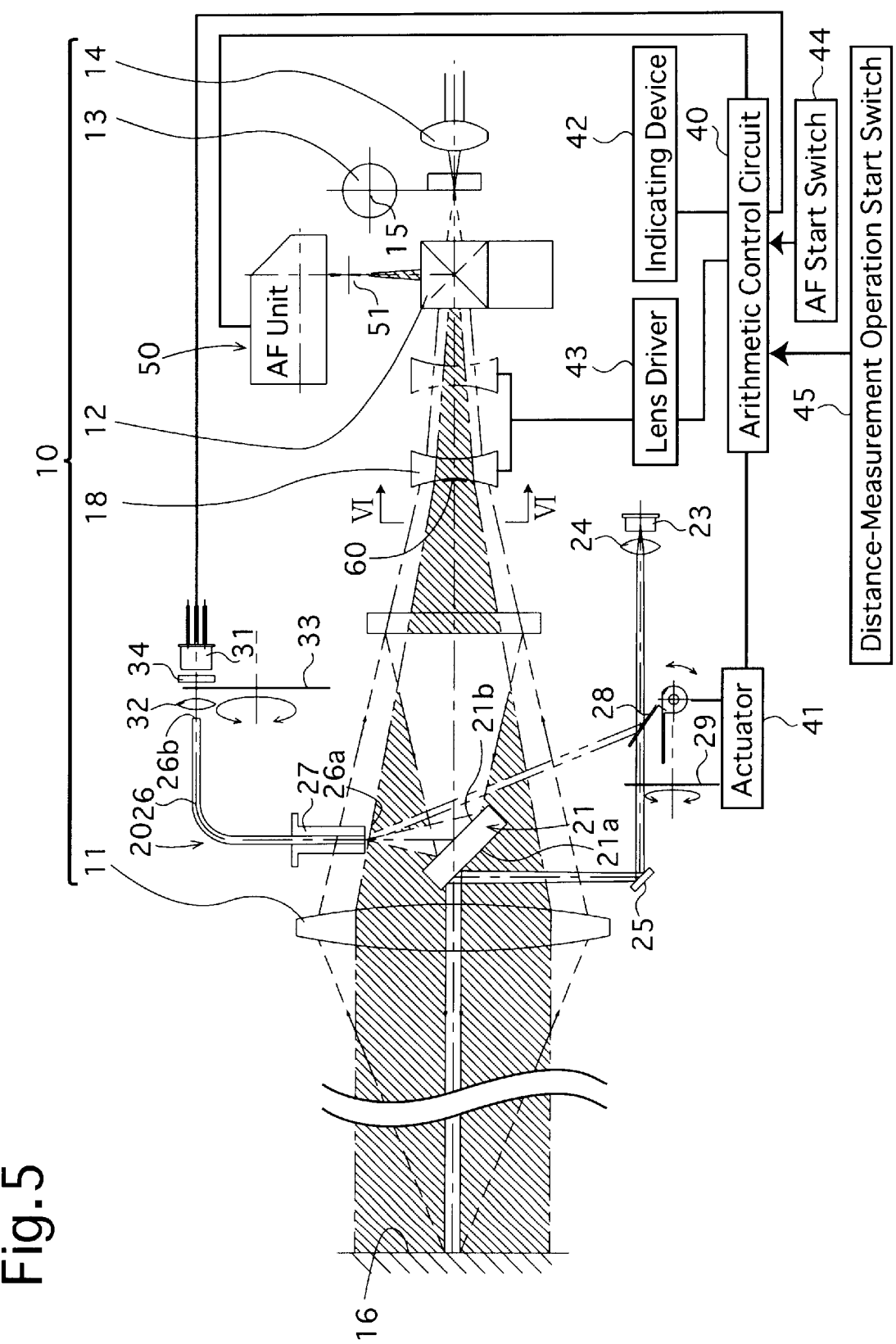
FIG. 5 is a view similar to that of FIG. 1, and illustrates the second embodiment of the electronic distance meter according to the present invention.

FIG. 5 shows the second embodiment of the electronic distance meter according to the present invention. In the second embodiment of the electronic distance meter, a focus adjustment lens 18 having a negative power is disposed between the objective lens 11 and the Porro prism 12 (the phase-difference detection AF sensor unit 50), while the objective lens 11 is provided as a stationary lens. According to the distance measuring optical system (the optical distance meter 20) shown in FIG. 5, it is advantageous for the focal length of the objective lens 11 to be short so as to increase efficiency of gathering the light to be emitted from the optical distance meter 20 which is reflected by the sighting object 16.

Figure 6:
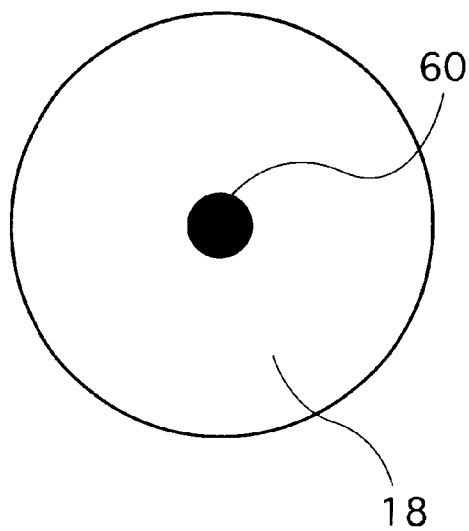
FIG. 6 is a front elevational view of a focus adjustment lens shown in FIG. 5, as viewed in the direction of arrows VI shown in FIG. 1.

In the second embodiment of the electronic distance meter, the light shield mask 60 is fixed to the focus adjustment lens 18 at the center thereof on the front surface (the surface facing the objective lens) of the focus adjustment lens 18 as shown in FIG. 6.

The structure of the second embodiment of the electronic distance meter is basically the same as that of the first embodiment of the electronic except that the focusing operation is performed by moving the focus adjustment lens 18 along the optical axis thereof. Similar to the first embodiment of the electronic distance meter, according to the second embodiment of the electronic distance meter, the ambient light which enters into the sighting telescope 10 via the eyepiece 14 can be prevented from being incident on the light-receiving element 31.

Figure 7:
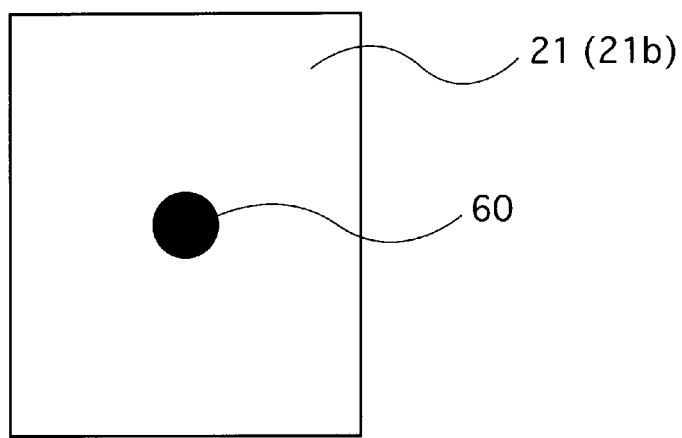
FIG. 7 is a plan view of a light-receiving mirror shown in FIG. 5, in the case where the light shield mask is fixed to the light-receiving mirror.

In each of the above described first and second embodiments, although the light shield mask 60 is fixed to the wavelength selection filter 22 or the focus adjustment lens 18, the light shield mask 60 can be fixed at a different position. For instance, the light shield mask 60 can be fixed to the light receiving mirror 21b of the light transmitting/receiving mirror 21 as shown in FIG. 7. The light shield mask 60 fixed to the light receiving mirror 21b can be smaller than the light shield mask 60 if the light shield mask is fixed on the light receiving mirror 21b at a position thereon which is closest to the eyepiece 14.

Figure 9:
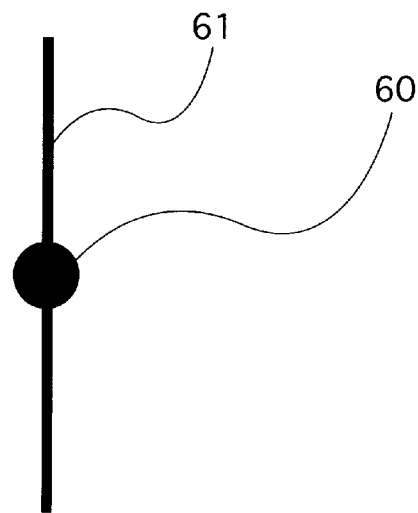
FIG. 9 is a plan view of a light shield mask, and an elongated mask supporting member which supports the light shield mask and is positioned in the optical path between the eyepiece of the sighting telescope and a light-receiving element in FIG. 5.

As shown by a hatched area in FIG. 8, ambient light which enters into the sighting telescope 10 via the eyepiece 14 converges in a direction from the eyepiece 14 toward the light transmitting/receiving mirror 21. Therefore, the size of the light shield mask needs to be greater as the light shield mask is positioned closer to the eyepiece 14. However, the width of the light shield mask 60 needs to be smaller as the light shield mask 60 is fixed to an optical element closer to the eyepiece 14 because the gap between the two light paths of the two light bundles which are respectively passed through two different pupil areas 11A and 11B becomes smaller the closer the two light bundles approach the eyepiece 14. Nevertheless, if these problems can be overcome, the light shield mask can be fixed to any optical element positioned between the eyepiece 14 and the light-receiving element 31. Alternatively, instead of fixing the light shield mask to an optical element, the light shield mask can be supported by an elongated mask supporting member 61 (see FIG. 9) positioned in the optical path between the eyepiece 14 and the light-receiving element 31.

As can be understood from the above descriptions, according to the present invention, a surveying instrument having an optical distance meter can be achieved in which ambient light which enters into the sighting telescope from the eyepiece thereof has no effect on the precision of the optical distance meter.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A surveying instrument comprising:
  a sighting telescope for sighting an object;
  an optical distance meter which includes a light-transmitting optical system for transmitting a measuring light toward said object via said sighting telescope, a light-receiving optical system for receiving light reflected by said object, and a light-receiving element which receives said measuring light reflected by said object and received by said light-receiving optical system;
  a light shield mask positioned on an optical axis between an eyepiece and said light-receiving element to cut off incoming rays from said eyepiece;
  wherein said light-transmitting optical system comprises:
    a wavelength selection filter which reflects said measuring light reflected by said object and passed through an objective lens of said sighting telescope, in a forward direction along an optical path of said sighting telescope; and
    a mirror which reflects said measuring light reflected by said wavelength selection filter outside the optical path of said sighting telescope.

2. The surveying instrument according to claim 1, wherein said light shield mask is fixed to said wavelength selection filter.

3. The surveying instrument according to claim 1, wherein said light shield mask is fixed to said mirror.

4. The surveying instrument according to claim 1, further comprising:

a focus detecting device for detecting a focus state of said sighting telescope; and a controller for controlling said sighting telescope to automatically focus on said object in accordance with said focus state detected by said focus detecting device.

5. The surveying instrument according to claim 1, wherein said focus detecting device comprises a phase-difference detection focus detecting device which detects an in-focus state from a correlation between a pair of images respectively formed by two light bundles which are respectively passed through two different pupil areas of said phase-difference detection focus detecting device and passed through different portions of an objective lens of said sighting telescope, and wherein said light shield mask is positioned so as not to interfere with said two different pupil areas.

6. The surveying instrument according to claim 4, wherein said sighting telescope comprises a focus adjustment lens having a negative power, which is moved in accordance with said focus state detected by said focus detecting device.

7. The surveying instrument according to claim 6, wherein said light shield mask is fixed to said focus adjustment lens.

8. The surveying instrument according to claim 1, wherein said wavelength selection filter reflects only a portion of light having specific wavelengths which is reflected by said object and passed through said objective lens.

9. The surveying instrument according to claim 1, wherein said mirror is made of a parallel-plate mirror having front and rear surfaces parallel to each other;

wherein said rear surface which faces said wavelength selection filter reflects said measuring light reflected by said wavelength selection filter toward said outside of said optical path of said sighting telescope.

10. The surveying instrument according to claim 2, wherein said objective lens of said sighting telescope is moved to bring said object in focus in accordance with said focus state detected by said focus detecting device.

11. The surveying instrument according to claim 3, wherein said objective lens of said sighting telescope is moved to bring said object in focus in accordance with said focus state detected by said focus detecting device.

* * * * *

UNITED STATES PATENT AND TRADEMARK OFFICE
CERTIFICATE OF CORRECTION

PATENT NO.   : 6,501,540 B2
DATED        : December 31, 2002
INVENTOR(S)  : M. Shirai et al.

It is certified that error appears in the above-identified patent and that said Letters Patent is hereby corrected as shown below:

<u>Title page,</u>
Item [73], Assignee, change "Pentax Corporation, Tokyo (JP)" to -- Pentax Corporation and Pentax Precision Co., Ltd., both of Tokyo (JP) --.

Signed and Sealed this

Twenty-sixth Day of August, 2003

JAMES E. ROGAN
*Director of the United States Patent and Trademark Office*

UNITED STATES PATENT AND TRADEMARK OFFICE
CERTIFICATE OF CORRECTION

PATENT NO.      : 6,501,540 B2
DATED           : December 31, 2002
INVENTOR(S)     : M. Shirai et al.

It is certified that error appears in the above-identified patent and that said Letters Patent is hereby corrected as shown below:

<u>Title page,</u>
Item [73], Assignee, change "Pentax Corporation, Tokyo (JP)" to -- Pentax Corporation and Asahi Seimitsu Kabushiki Kaisha, both of Tokyo (JP) --.

This certificate supersedes Certificate of Correction issued August 26, 2003.

Signed and Sealed this

Twenty-fifth Day of November, 2003

JAMES E. ROGAN
*Director of the United States Patent and Trademark Office*